Oct. 9, 1934.          H. B. CLAUS          1,976,434
OIL GAUGE ROD AND WIPER
Original Filed March 22, 1930
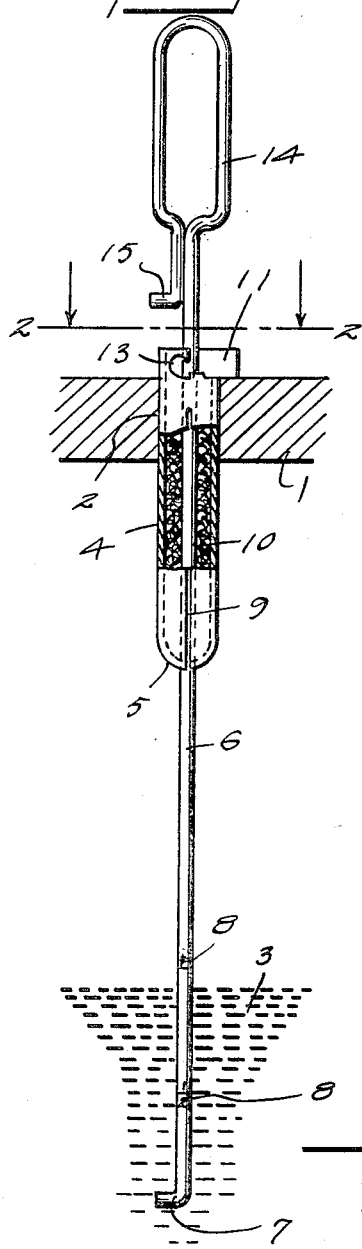
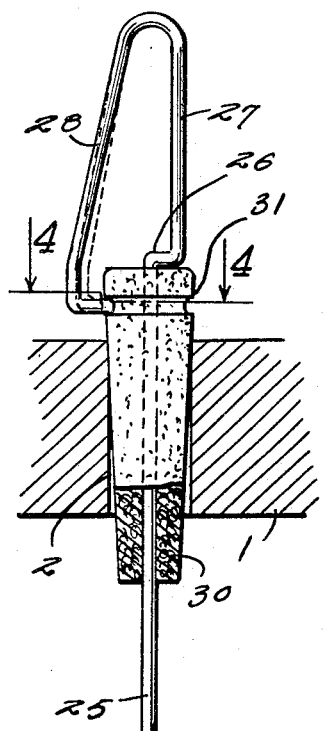
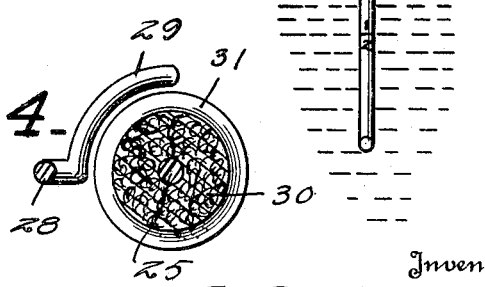
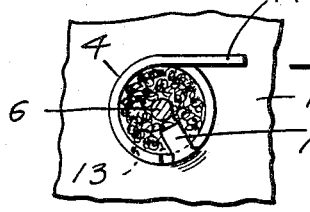
Inventor
H. B. Claus
By Watson E. Coleman
Attorney Patented Oct. 9, 1934

1,976,434

UNITED STATES PATENT OFFICE 1,976,434

OIL GAUGE ROD AND WIPER

Herman B. Claus, Otis, Oreg., assignor to Olin M. Kiggins, Portland, Oreg.

Application March 22, 1930, Serial No. 438,158
Renewed August 23, 1934

15 Claims. (Cl. 73—120)

This invention relates to improvements in gauge rods of the type used for determining the depth of oil in the crank case of a motor vehicle engine, and holding and wiping means therefor.

The primary object of the present invention is to provide an oil depth gauge rod having a wiping element permanently associated therewith and so construtced that the gauge rod may be wiped free of oil thereon above the level of the oil into which it extends without removing the rod completely from the engine casing.

Another object of the invention is to provide an oil depth gauge rod having a wiper permanently attached thereto so that after the rod has been wiped free of oil and reinserted into the oil it may be removed with the wiper for determining the point to which the oil has risen thereon.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 represents the preferred form of my invention showing the same partly in side elevation and partly in section and in position in an engine crank case.

Figure 2 is a sectional view taken on the line 2—2 of Figure 1.

Figure 3 shows a modified form of the invention.

Figure 4 is a sectional view taken on the line 4—4 of Figure 3.

Referring more particularly to the drawing wherein like numerals of reference indicate corresponding parts throughout the several views, the numeral 1 in each of the Figures 1 and 3 represents a portion of an engine crank casing in which is formed an aperture 2 through which the gauge rod may be inserted for extension into the oil 3 within the casing.

In the form of my invention shown in Figure 1 there is provided an elongated cylindrical body 4 rounded and closed at its inner end as indicated at 5 except for a small central passage through which the body of an elongated rod 6 is adapted to snugly pass.

The rod 6 represents the gauge rod which is extended into the oil within the crank casing for the purpose of determining the depth of the oil by observing the height to which the oil has risen thereon when it is inserted into the crank casing through the aperture 2 in the wall thereof. The inner end of this rod is turned as indicated at 7, for the purpose hereinafter to be described and at suitable points thereon graduation marks 8 are placed so that it will be easy to determine whether the crank casing is half full, full or nearly empty of oil.

The tubular body has at diametrically opposite points in the wall thereof a longitudinally extending slot 9 which extends from the inner end 6 to a point adjacent the outer end as shown. Within the body 4 there is tightly packed a wiping absorbent material 10 of a suitable character, this material, of course, being packed closely around the rod 6 so that as the rod is reciprocated in the receptacle 4 any oil adhering thereto will be wiped off by this material.

At its outer end the edge of the open receptacle 4 is slightly longitudinally and circumferentially split to form the tongue 11 which is turned to extend from the wall of the receptacle as shown in Figure 2 for the purpose of providing a stop which will prevent the complete insertion of the receptacle 4 into the crank casing. A portion of this cut out edge is turned inwardly as at 12 to provide a wiping material retaining tongue and the edge of the longitudinal split formed adjacent the tongue 12 is cut in to provide a notch 13.

The outer end of the rod 6 is formed to provide the elongated handle loop 14, the free end of the portion of the rod turned back to form this handle loop being bent to project laterally to form a tongue 15 which is adapted to engage in the notch 13 when the rod is moved inwardly so that the rod and the wiper containing receptacle may be interlocked for movement together, that is when they are so joined they may both be withdrawn from the aperture 2 in the crank casing wall. By providing the slot 9 in the wiping material receptacle the inner end of the receptacle may be made of slightly greater diameter than the aperture 2 so that a slight resistance will be set up to the withdrawal of the receptacle. The slots 9 will permit the compression of the inner end of the receptacle and allow it to be removed from the aperture when a sufficiently strong pull is applied thereto.

In the other form of my invention shown in Figure 3 the gauge rod 25, while the same at its inner end as the rod 6, has at its outer end an offset portion 26 and an open loop handle 27 continuing from this offset portion, the free arm 28 of this loop handle terminating in an arcuate portion 29 disposed in a plane at right angles to the length of the rod.

The shank portion of the rod inwardly of the handle 26 passes through an elongated tapered body 30 formed of a suitable wiping material such for example as heavy felt. Adjacent its outer end or the end of greatest diameter there is formed about the exterior of this body a groove 31 into which the arcuate portion 29 of the handle is adapted to engage to form an interlocking connection therewith.

The tapered felt body 30 is designed to snugly enter the aperture 2 in the crank case wall and the arm 28, which is resilient, normally stands out free from contact with the body 30. From this it will be seen that the rod may be drawn out through the body without moving the body from position. In each of the forms of the invention it will be seen that the rod may be drawn out through the wiping material to remove oil therefrom without disturbing the position of the material in the aperture of the casing. After the rod has been drawn out as described to remove the oil it is then reinserted into the oil and upon the second removal the wiping material is removed from the aperture 2 with the rod. In the case of the structure shown in Figure 1 this is effected by shoving the turned portion 15 of the rod handle into position where, upon slightly rotating the rod, this portion will interlock in the notch 13 so that the rod and the container for the wiping material will be fixed together.

In the structure shown in Figure 3 after the rod has been wiped free of oil and reinserted into the crank casing the handle 27 is grasped and squeezed so that the resilient arm 28 will be swung in and the arcuate portion 29 thereof interlocked with the body 30 by engagement in the groove 31 of this body, after which the body and the rod may be easily withdrawn together as will be readily understood.

In describing and claiming an interlocking connection between the rods and the bodies through which they extend, a distinction should be understood between a mere frictional connection and other forms of connections which might be employed and which would answer the definition of "interlocking".

From the foregoing description it will be readily appreciated that with either one of the devices shown the gauge rod may be easily wiped to free it from oil which may be adhering thereto as a result of the splashing of the oil in the casing by the movement of the parts of the engine therein, and this wiping operation may be performed without completely removing the rod from the casing for the application of a wiping rag or cloth thereto as is the usual method. Upon reinsertion of the rod it is free of oil so that the correct height to which the oil in the casing rises thereon may be readily determined when the rod is removed with the wiper element which surrounds it.

Having thus described my invention, what I claim is:—

1. A device of the character described for use in association with a fluid container having an opening in one wall, said device comprising a rod, a wiper body having an opening therethrough and having said rod reciprocably mounted therein, said body being designed for insertion into said first mentioned opening, said rod having a handle to facilitate its being partially withdrawn from the container through the wiper body, and means whereby the rod and the wiper body may be interlocked so as to be withdrawn from the aperture of the container as a unit.

2. A device of the character described for use in association with a fluid container having an opening in one wall, said device comprising a body having an opening therethrough and adapted to be positioned in said container opening, a gauge rod having a handle at the outer end thereof and extending through and reciprocable in said body, means at the inner end of the rod for preventing its complete withdrawal through the body, and means whereby the rod and said body may be interlocked so as to be shifted as a unit.

3. An oil depth gauge device for an engine crank case having an aperture therein, said device comprising a body having an opening therethrough and consisting of absorbent material, said body being adapted to be disposed in said aperture, a gauge rod extending through said body and shiftable relative thereto, said rod having a handle at its outer end, and means linking the handle of the rod with said body for the removal of the body with the rod from said aperture as a unit.

4. A gauge rod device for a fluid containing body having an opening through one wall thereof, said device comprising an elongated casing having oppositely positioned end openings and an absorbent wiping material therein, a rod extending longitudinally through the casing through said openings and said material and having a handle upon its outer end, said casing being adapted to snugly engage in said aperture, and means for coupling the handle with said casing to facilitate their removal from the engine crank case as a unit.

5. A gauge rod and wiper device for a fluid containing body having an aperture through one wall thereof, said device comprising an elongated cylindrical receptacle adapted to be inserted into said aperture, a gauge rod reciprocably extending through the receptacle, said receptacle having one end thereof reduced and provided with an opening of a size to snugly receive the rod, an absorbent packing material within the receptacle surrounding the rod, a handle formed at the outer end of the rod, and means including a lateral extension on said handle whereby the adjacent end of the casing may be engaged for coupling the rod and casing together.

6. A device of the character described for use in a fluid containing case having an aperture in one wall thereof, said device comprising an elongated casing having a restricted apertured end and being open at its opposite end, a rod extending through said casing, an absorbent packing material in the casing surrounding the rod, said casing being designed for extension into said first mentioned aperture, a lateral tongue formed at the said opposite end of the casing for limiting the movement of the casing into the first mentioned aperture, means to provide a hook at the said opposite end of the casing, and an engaging element formed at the outer end of said rod being adapted to engage said hook means for coupling the rod and casing together.

7. A device of the character described for use in a fluid containing case having an aperture in one wall thereof, said device comprising an elongated casing having a restricted apertured end and being open at its opposite end, a rod extending through said casing, an absorbent packing material in the casing surrounding the rod, said casing being designed for extension into said first mentioned aperture, a lateral tongue formed at the said opposite end of the casing for limiting the movement of the casing into the said first aperture, means to provide a hook at the said opposite end of the casing, and an engaging element formed at the outer end of said rod being adapted to engage said hook means for coupling the rod and casing together, said casing being of slightly greater diameter at its restricted end than the aperture in the casing wall and further being longitudinally split to permit of the contraction of the said end for the removal of the casing from the aperture.

8. A device of the character described for use in a fluid containing case having an aperture in one wall thereof, said device comprising an elongated body of absorbent material adapted to be extended into said aperture and having a longitudinal passage therethrough, a rod reciprocably extended through said passage and being formed at one end to provide a handle having a free resilient leg terminating in an arcuate member disposed in a plane at right angles to the length of the rod, and said body having a circumferential groove therein adapted to receive said arcuate member when the said resilient leg is forced inwardly toward the body.

9. In a device for determining the level of liquid in a container, a rod adapted to be inserted into the container, a sleeve slidable on said rod, wiping means for said rod carried by said sleeve and coacting locking means respectively on said sleeve and said rod for locking them together, said locking means being adapted to be manually released by appropriate manipulation.

10. In a fluid receptacle having a hole for receiving a measuring rod, a sleeve adapted to fit into said hole, a rod adapted to slide in said sleeve, a wiper for said rod carried by said sleeve and means for locking said sleeve and said rod together against movement longitudinally of the rod.

11. In a device for determining the level of liquid in a container, a rod adapted to be inserted into the container, a sleeve slidable on said rod, wiping means for said rod carried by said sleeve, and means for locking said rod and sleeve together adapted to be manually released by appropriate manipulation comprising a groove in said sleeve and a part on said rod adapted to engage said groove.

12. In a device for determining the level of liquid in a container, a rod adapted to be inserted into the container, a sleeve slidable on said rod, wiping means for said rod carried by said sleeve and means for locking said rod and sleeve together adapted to be manually released by appropriate manipulation comprising a groove in said sleeve and a bend in the end of said rod so that the end of said rod may engage said groove.

13. In a device for determining the level of liquid in a container, a rod adapted to be inserted into the container, a sleeve slidable on said rod, means on said sleeve preventing the sleeve from completely entering said container, and locking means on said sleeve and said rod for locking them together against relative movement longitudinally of the rod adapted to be released by appropriate manipulation.

14. In a fluid receptacle having a hole for receiving a measuring rod, a sleeve adapted to fit into said hole, means on said sleeve preventing the sleeve from completely entering said container, a rod adapted to slide in said sleeve, and means for locking said sleeve and said rod together against relative movement longitudinally of the rod.

15. In a device for determining the level of liquid in a container, a rod adapted to be inserted into the container, a sleeve slidable on said rod, and slidably mounted in an opening in said container and means for locking said rod and sleeve together adapted to be manually released by appropriate manipulation comprising a groove in said sleeve and a part on said rod adapted to engage said groove.

HERMAN B. CLAUS.